128,678

UNITED STATES PATENT OFFICE.

OLIVER A. TOOKER, OF GREEN BAY, WISCONSIN.

IMPROVEMENT IN COMPOUNDS FOR RENDERING SUBSTANCES FIRE-PROOF.

Specification forming part of Letters Patent No. 128,678, dated July 2, 1872.

SPECIFICATION.

*To all whom it may concern:*

Be it known that I, OLIVER A. TOOKER, of Green Bay, in the county of Brown and in the State of Wisconsin, have invented an Improved Compound for Rendering Substances Fire-Proof; and do hereby declare that the following description forms a full and exact specification of the same, wherein I have set forth the nature and principles of my said improvement, by which my invention may be distinguished from others of a similar class, together with such parts as I claim and desire to secure by Letters Patent.

My invention relates to compounds made use of for the purpose of rendering wood and other substances fire-proof; and the nature thereof consists in mixing wheat-flour, carbonate of potash, water, and glue, and thereby forming a fire-proof wash, which may be applied with facility to the exterior surface of substances to be protected from ignition.

To prepare the said compound, take six to eight ounces of flour and sufficient water thereto to make a paste; dissolve three ounces of common glue and add the same to the paste; after which add eight ounces of potash dissolved, and stir the ingredients well together; it will then be ready for use.

Having thus described my invention, I claim and desire to secure by Letters Patent—

The manufacture and preparation of a compound for preventing ignition, of the ingredients, in the proportion and for the purpose set forth.

In testimony that I claim the foregoing I have hereunto set my hand this 19th day of June, 1871.

OLIVER A. TOOKER.

Witnesses:
FRANK VAN STRALEN,
U. H. PEAK.